United States Patent
Yu et al.

(10) Patent No.: US 8,909,919 B2
(45) Date of Patent: Dec. 9, 2014

(54) AUTHENTICATION SYSTEM AND METHOD FOR DIGITAL TELEVISIONS

(71) Applicant: Shenzhen Skyworth-RGB Electronics Co. Ltd., Shenzhen, Guangdong Prov. (CN)

(72) Inventors: Zhao-Fu Yu, Shenzhen (CN); Ji Bai, Shenzhen (CN); Yan-Sheng Shao, Shenzhen (CN)

(73) Assignee: Shenzhen Skyworth-RGB Electronics Co. Ltd., Shenzhen, Guangdong Prov. (CA)

( * ) Notice: Subject to any disclaimer, the term of this patent is extended or adjusted under 35 U.S.C. 154(b) by 0 days.

(21) Appl. No.: 13/844,880

(22) Filed: Mar. 16, 2013

(65) Prior Publication Data
US 2014/0032898 A1 Jan. 30, 2014

(30) Foreign Application Priority Data
Jul. 26, 2012 (CN) .......................... 2012 1 0260758

(51) Int. Cl.
| | |
|---|---|
| H04L 29/06 | (2006.01) |
| H04N 21/418 | (2011.01) |
| H04N 21/235 | (2011.01) |
| H04N 21/6334 | (2011.01) |
| H04N 21/266 | (2011.01) |
| H04N 21/4623 | (2011.01) |
| H04L 9/32 | (2006.01) |
| H04N 21/4405 | (2011.01) |
| H04N 21/435 | (2011.01) |

(52) U.S. Cl.
CPC ......... *H04N 21/4181* (2013.01); *H04N 21/235* (2013.01); *H04N 21/6334* (2013.01); *H04N 21/26613* (2013.01); *H04N 21/4623* (2013.01); *H04L 9/3234* (2013.01); *H04N 21/4405* (2013.01); *H04N 21/435* (2013.01); *H04N 21/418* (2013.01)

USPC .......................................... 713/156; 713/159

(58) Field of Classification Search
CPC ............ H04N 21/4181; H04N 21/235; H04N 21/6334; H04N 21/26613; H04N 21/4623; H04N 21/4405; H04N 21/435; H04N 21/418; H04L 9/3234
USPC .................................................. 713/156, 159
See application file for complete search history.

(56) References Cited

U.S. PATENT DOCUMENTS

| | | | |
|---|---|---|---|
| 6,697,489 B1 * | 2/2004 | Candelore ..................... | 380/200 |
| 2005/0130585 A1 * | 6/2005 | Gnuschke et al. ........... | 455/3.06 |
| 2007/0005503 A1 * | 1/2007 | Engstrom et al. ............... | 705/59 |
| 2010/0146560 A1 * | 6/2010 | Bonfrer .......................... | 725/62 |
| 2012/0321080 A1 * | 12/2012 | Candelore et al. ............ | 380/201 |

* cited by examiner

Primary Examiner — Chau Le
(74) Attorney, Agent, or Firm — Tim Tingkang Xia, Esq.

(57) ABSTRACT

The invention relates to digital television authentication system and method. The system includes a digital television having a digital television master chip; an SIM card module with a built-in SIM card, connected to the digital television master chip, and an authentication server wirelessly connected to the SIM card. The SIM card module includes a symmetric key generation unit used for generating a symmetric encryption key CT according to a Session Key (SEK) received by the SIM card and an identity (ID) of the SIM card; and a CW acquisition unit used for decrypting, according to the symmetric encryption key CT, an ECW sent by the authentication server, to obtain a CW. The authentication server includes an SEK generation unit used for randomly generating a string and taking the string as an SEK; and an SEK sending unit used for sending the SEK to the SIM card module.

11 Claims, 3 Drawing Sheets

AUTHENTICATION SYSTEM AND METHOD FOR DIGITAL TELEVISIONS

CROSS-REFERENCE TO RELATED APPLICATION

This application claims the priority to Chinese Patent Application No. 201210260758.X, filed in the State Intellectual Property Office of P.R. China. on Jul. 26, 2012, which is hereby incorporated herein in its entirety by reference.

FIELD OF THE INVENTION

The present invention relates generally to authentication technologies, and more particularly to authentication system and method for digital televisions.

BACKGROUND OF THE INVENTION

At present, a digital television Conditional Access System (CAS) is a core link in a digital television service chain, which implements user entitlement management functions such as product segmentation, data encryption, authorized access control of digital television service data, thereby ensuring that the user legally watches, through a single-item wired network, encrypted and paid television programs provided by a digital television provider; and the CAS is also a technical basis for digital television providers to charge.

The existing digital television CAS generally performs scrambling protection on original digital television data by using a three-layer key (or multiple-layer key) system. A conventional three-layer key system includes a Control Word (CW), a Service Key (SK), and a Personal Distribute Key (PDK). A front-end scrambling system performs scrambling on audio/video and data services of the digital television by using the CW; meanwhile, the front-end digital television CAS performs scrambling protection on the CW through the SK, to generate an Encrypted Control Word (ECW), which in turn, is protected by the PDK to generate a user Entitle Manage Message (EMM). The user EMM is then transmitted to a receiving module of a set top box.

In a conventional CA card authentication, a software impulse at a digital television terminal receives a data packet. A digital television filter module performs filtering processing on the data packet to obtain the user EMM and an Entitlement Control Message (ECM). The obtained user EMM and ECM are sent to the CA card. The CA card performs descrambling on the user EMM by using the PDK to acquire SK information, and then performs descrambling on the ECM by using the SK to acquire the ECW, performs descrambling on the ECW to acquire the CW, encrypts the CW, and transmits the encrypted CW to a machine-card communication module on the digital television. The machine-card communication module stores the CW in plaintext into a Random Access Memory (RAM) of the digital television. A digital television master chip then reads the CW for descrambling and decoding.

In such conventional authentication, a unique identifier of the user is provided by the CA card, and the CA card frequently communicates with the set top box. If hackers crack the password, a risk that an algorithm is stolen exists. Additionally, upgrading in the conventional authentication is not only inconvenient, but also cause a high cost.

Therefore, a heretofore unaddressed need exists in the art to address the aforementioned deficiencies and inadequacies.

SUMMARY OF THE INVENTION

Embodiments of the present invention provide a digital television authentication system and method to solve the problems in the existing CA card authentication that upgrading and replacement are inconvenient due to bundling of software and hardware, the replacement cost is high, and the CA card is easily duplicated so as to make the protection difficult.

In one aspect of the present invention, a digital television authentication system includes a digital television having a digital television master chip; an SIM card module with a built-in SIM card and an authentication server wirelessly connected to the SIM card.

The SIM card module further includes a symmetric key generation unit used for generating a symmetric encryption key CT according to a Session Key (SEK) received by the SIM card and an identity (ID) of the SIM card; and a CW acquisition unit used for decrypting, according to the symmetric encryption key CT, an ECW sent by the authentication server, to obtain a CW.

The SIM card module is connected to the digital television master chip through a universal interface, and used for sending the CW to the digital television master chip, so that the digital television master chip performs, according to the CW, descrambling on an encrypted Transport Stream (TS) sent by the authentication server.

The authentication server includes an SEK generation unit used for randomly generating a string and taking the string as an SEK; and an SEK sending unit used for sending the SEK to the SIM card module.

In another aspect of the present invention, a digital television authentication method includes receiving an SEK sent by an authentication server, and generating a symmetric encryption key CT according to the SEK and an ID of the SIM card; decrypting, according to the symmetric encryption key CT, an ECW sent by the authentication server, to obtain a CW; and sending the CW to the digital television master chip, so that the digital television master chip performs, according to the CW, descrambling on an encrypted TS sent by the authentication server.

In yet another aspect, the present invention relates to a non-transitory tangible computer-readable medium storing instructions which, when executed by a processor, cause a system to perform the above-disclosed digital television authentication method.

According to the present invention, an authentication server randomly generates a string, takes the string as an SEK, and sends the SEK to an SIM card module; the SIM card module generates a symmetric encryption key CT according to the SEK and an ID of the SIM card, decrypts, according to the symmetric encryption key CT, an ECW sent by the authentication server, to obtain a CW, and sends the CW to a digital television master chip, so that the digital television master chip performs, according to the CW, descrambling on an encrypted TS sent by the authentication server, to obtain a plaintext stream. In the present invention, the SEK is randomly generated, so the symmetric encryption key CT varies as the SEK varies, thereby solving the problems in the existing CA card authentication.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE INVENTION

Figure 1:
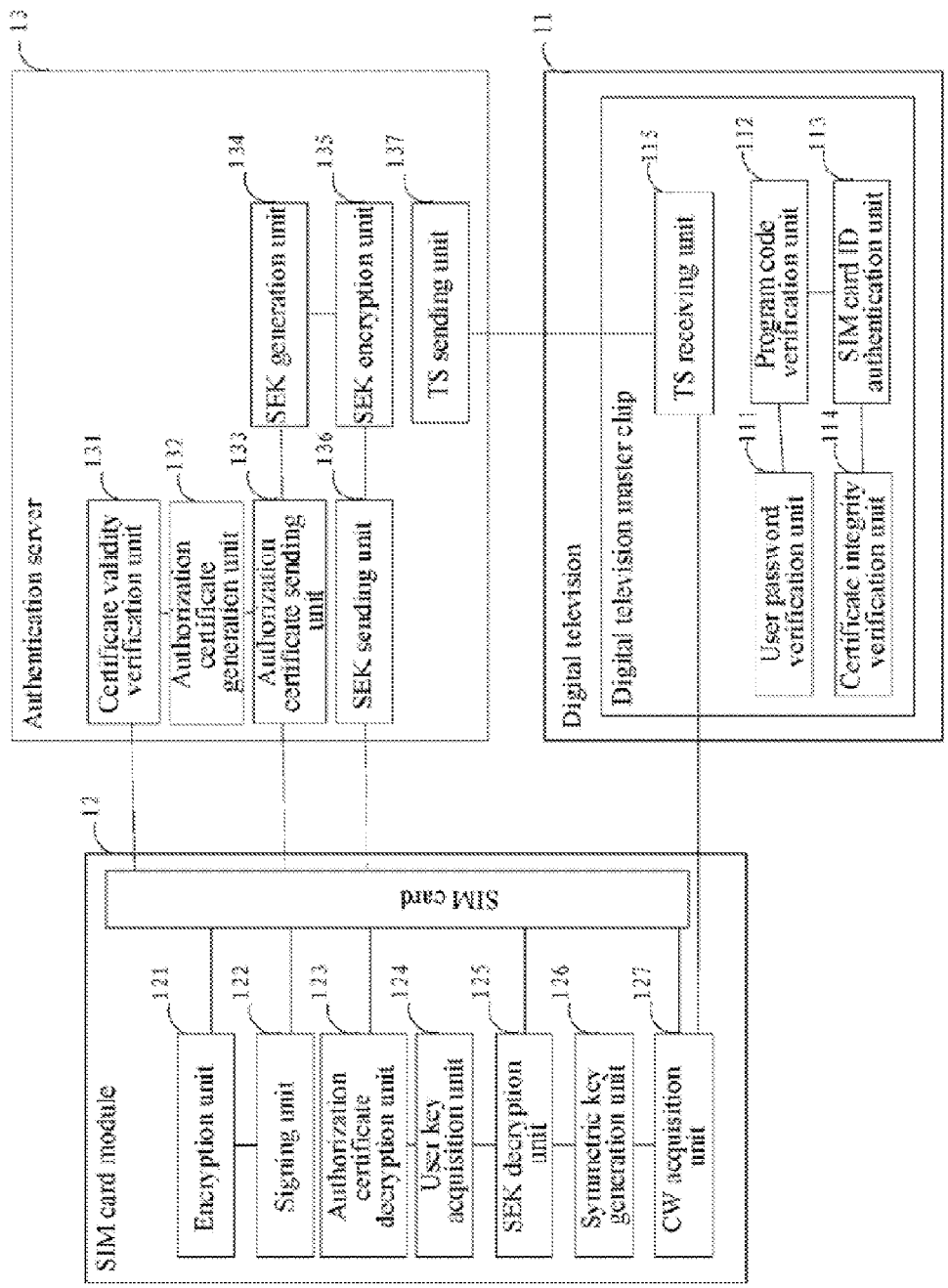
FIG. 1 shows schematically a structural block of a digital television authentication system according to one embodiment of the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The description will be made as to the embodiments of the present disclosure in conjunction with the accompanying drawings in FIGS. 1-3. It should be understood that specific embodiments described herein are merely used for explaining the present invention, but are not intended to limit the present invention. In accordance with the purposes of this disclosure, as embodied and broadly described herein, this invention, in one aspect, relates to authentication system and method for digital televisions.

According to the present invention, the system includes a digital television having a digital television master chip, an SIM card module with a built-in SIM card, and an authentication server. The authentication server randomly generates a string, takes the string as an SEK, and sends the SEK to the SIM card module. The SIM card module generates a symmetric encryption key CT according to the SEK received by the SIM card and an ID of the SIM card, decrypts, according to the symmetric encryption key CT, an ECW sent by the authentication server, to obtain a CW, and sends the CW to a digital television master chip, so that the digital television master chip performs, according to the CW, descrambling on an encrypted TS sent by the authentication server, thereby achieving an objective of digital television authentication.

Without intent to limit the scope of the invention, the implementation of the present invention is described in detail with specific embodiments below.

Referring to FIG. 1, a structural block diagram of a digital television authentication system is schematically shown according to one embodiment of the present invention. For illustrative purposes, parts that are relevant to the embodiment of the present invention are merely shown. In this embodiment, the digital television authentication system includes a digital television 11, an SIM card module 12, and an authentication server 13.

In this embodiment, both of the SIM card module 12 and the authentication server 13 have a Central Processing Unit (CPU) with processing capability meeting requirements, and both have a certificate and a public key of the same key management center. The certificate of the same key management center includes: an original certificate at an SIM card module, a signature result by using a second private key SP to sign an abstract of the original certificate, and a digital certificate at an authentication server; the public key includes a first pubic key CK, a second public key SK, an encryption public key UK, a first private key CP, a second private key SP, and a decryption private key UP based on an asymmetrical encryption algorithm RSA of a Public Key Infrastructure (PKI), and further includes a symmetric encryption key CT and an MD5 algorithm.

The digital television 11 includes a digital television master chip. In one embodiment, the digital television master chip includes:

a user password verification unit 111 used for verifying whether an original password stored in the SIM card module is consistent with a password input by a user;

a program code verification unit 112 used for verifying integrity of a program code stored in the SIM card module;

an SIM card ID authentication unit 113 used for verifying an ID of the SIM card module;

a certificate integrity verification unit 114 used for verifying integrity of an original certificate stored in the SIM card module; and a TS receiving unit 115 used for receiving an encrypted TS sent by the authentication server, performing descrambling on the encrypted TS by using a CW delivered by the SIM card module, to obtain a plaintext stream.

The SIM card module 12 has a built-in SIM card and is connected to the digital television through a universal interface. In one embodiment, the universal interface is a Universal Serial Bus (USB) interface. In one embodiment, the SIM card module 12 includes:

an encryption unit 121 used for encrypting, by using the first public key CK, the original certificate stored in the SIM card module, to obtain a verification certificate;

a signing unit 122 used for obtaining an MD5 abstract value of the original certificate stored in the SIM card module, and signing the abstract value by using the first private key CP, to obtain a verification signature;

an authorization certificate decryption unit 123 used for decrypting, by using the second public key SK, a PDK authorization certificate received by the SIM card, to obtain a PDK authorization certificate plaintext, and extracting a PDK index from the PDK authorization certificate plaintext;

a PDK acquisition unit 124 used for acquiring an encryption public key UK and a decryption private key UP according to the ID of the SIM card and the PDK index;

an SEK decryption unit 125 used for decrypting, by using the decryption private key UP, an encrypted SEK received by the SIM card, to obtain a signature; performing decryption and verification by using the first public key CK, to obtain the SEK;

a symmetric key generation unit 126 used for generating a symmetric encryption key CT according to the SEK received by the SIM card and the ID of the SIM card; and a CW acquisition unit 127 used for decrypting, according to the symmetric encryption key CT, an ECW sent by the authentication server, to obtain a CW.

The SIM card module is electrically connected to the digital television master chip through the universal interface, and is used for sending the CW to the digital television master chip, so that the digital television master chip performs, according to the CW, descrambling on the encrypted TS sent by the authentication server.

In one embodiment, an internal storage area of the SIM card is divided into two parts: an asymmetric encryption area and a symmetric encryption area. The asymmetric encryption area stores a signature result obtained by signing the abstract of the program code through the first private key CP, a signature result obtained by signing the abstract of the program code through the second private key SP, a signature result obtained by signing the abstract of the original certificate through the second private key SP, the ID of the SIM card, the program code, the original password, the original certificate, and the asymmetrical encryption algorithm RSA based on the PKI; and the symmetric encryption area is used for storing the symmetric encryption key CT and temporary communication information during the communication.

In one embodiment, the authentication server 13 is wirelessly connected to the SIM card module, and includes:

a certificate validity verification unit 131 used for decrypting, by using the first private key CP, a verification certificate sent by the SIM card, to obtain a plaintext certificate, abstracting the plaintext certificate by using MD5 to obtain an abstract value r1; meanwhile, verifying, by using the first public key CK, the verification signature sent by the SIM card, to obtain an abstract value r2; finally, comparing whether r1 is equal to r2; if they are equal, verifying that the verification certificate delivered by the SIM card is the original certificate; if the verification certificate delivered by the SIM card is the original certificate, judging a validation period of the plaintext certificate; and if the plaintext certificate is within the validation period, verifying that the verification certificate sent by the SIM card is valid, and sending a PDK authorization certificate to the SIM card;

an authorization certificate generation unit 132 used for encrypting, by using the second private key SP, a digital certificate stored at the authentication server, and generating the PDK authorization certificate;

an authorization certificate sending unit 133 used for sending the PDK authorization certificate to the SIM card;

an SEK generation unit 134 used for randomly generating a string and taking the string as an SEK; where in one embodiment, the string is a 16-bit character;

an SEK encryption unit 135 used for signing, by using the first private key CP, the randomly generated string, and encrypting the signature by using the encryption public key UK, to obtain the encrypted SEK;

an SEK sending unit 136 used for sending the SEK to the SIM card; and a TS sending unit 137 used for performing scrambling on an audio/video and a data service of the digital television by using the CW, to obtain an encrypted TS, and sending the encrypted TS to the digital television master chip.

It should be noted that, in the foregoing embodiment of the digital television authentication system, the included units are classified merely according to a functional logic, but are not limited to the foregoing classification, as long as the corresponding functions can be implemented. In addition, the specific names of the functional units are given merely for the purpose of easy distinguishing, and are not intended to limit the protection scope of the present invention.

The digital television authentication system according to this embodiment of the present invention may be applied in a digital television authentication method, which is described as follows in details.

Figure 2:
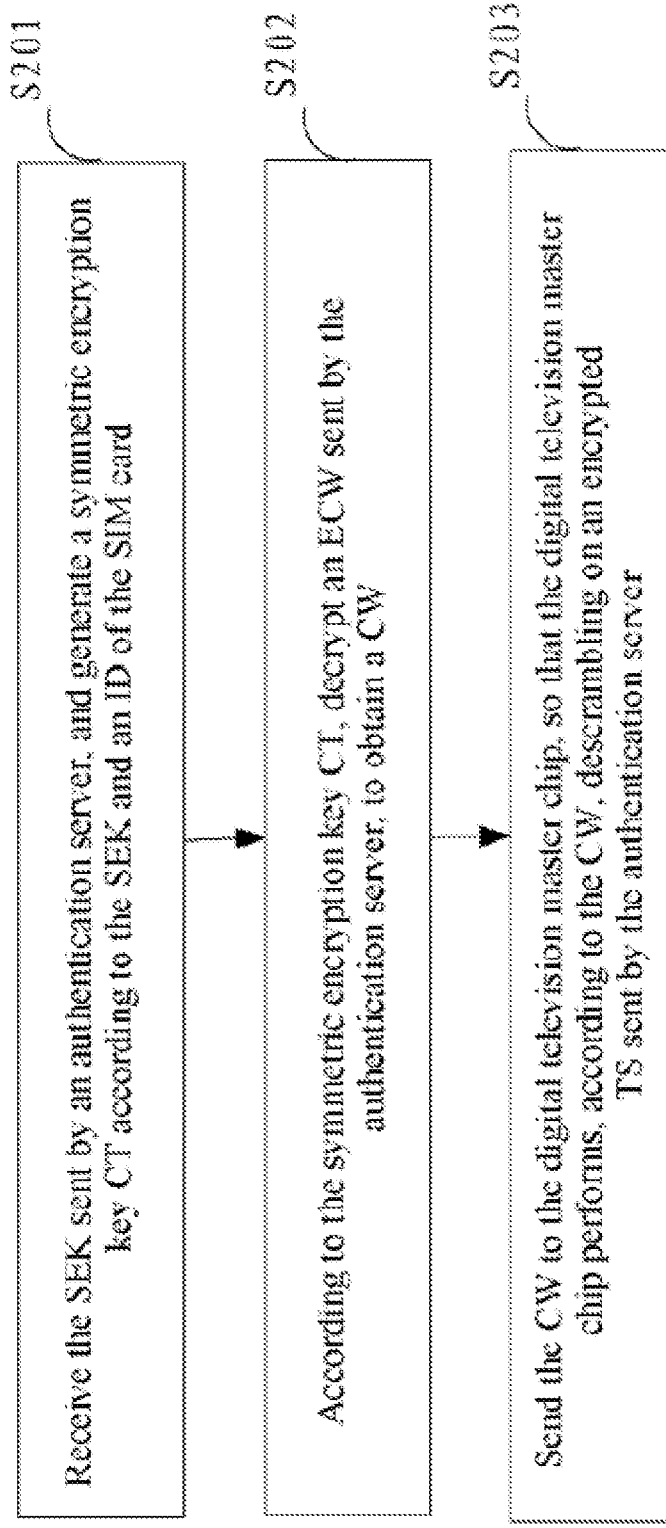
FIG. 2 shows schematically a flow chart of a digital television authentication method according to one embodiment of the present invention.

FIG. 2 shows schematically an implementation flow of the digital television authentication method according to one of the present invention.

According to the invention, before the digital television authentication, a digital television master chip needs to perform a local ID verification, including user password verification, program code verification, SIM card ID authentication, and certificate verification. In one embodiment, during the user password verification, it is verified whether an original password stored in the SIM card module is consistent with a password input by the user. Specifically, the following steps are performed.

The digital television prompts the user to input a decimal user password of 6-16 bits, the user inputs the user password by using a remote control, and the digital television master chip receives the user password.

An MD5 abstract value r0 of the original password stored in an asymmetric area is obtained.

An MD5 abstract value r1 of the user password is obtained.

r0 is compared with r1; if r1=r0, log in to the system.

If r1 is not equal to r0, it is determined whether the number N of login times is less than 5; if N<5, r1 is cleared, and a login interface is returned; meanwhile, N=N+1 is set; otherwise, it is determined that the number N of login times is equal to 5, the system is directly logged off, and the login section is locked; and N is set to 1 (N is a positive integer, and N=1 in the initial login).

In one embodiment, during the program code verification, integrity of a program code stored in the SIM card module is verified, which includes the following steps.

The digital television master chip abstracts, by using MD5, the program code stored in the asymmetric encryption area, to obtain an abstract value r1.

A signature result obtained by signing the abstract of the program code through the second private key SP is read from the asymmetric encryption area, and is decrypted by using the second public key SK, to obtain an abstract value r2.

r1 is compared with r2, and if r1=r2, it indicates that the verification succeeds.

If r1 is not equal to r2, it indicates that the verification fails, log off the system, and login is locked.

In one embodiment, during the SIM card ID authentication, the ID of the SIM card module is verified, which includes the following steps.

The digital television master chip reads the ID of the SIM card, abstracts the ID by using MD5 to obtain an abstract value r1.

A signature result obtained by signing the abstract of the program code through the first private key CP is read from the asymmetric encryption area, and is decrypted by using the first public key CK, to obtain an abstract value r2.

r1 is compared with r2, and if r1=r2, it indicates that the verification succeeds.

If r1 is not equal to r2, it indicates that the verification fails, log off the system, and login is locked.

In one embodiment, during the original certificate verification, integrity of the original certificate stored in the SIM card module is verified, which includes the following steps.

The digital television master chip reads the original certificate, abstracts the original certificate by using MD5 to obtain an abstract value r1.

A signature result obtained by signing the abstract of the original certificate through the second private key SP is read from the asymmetric encryption area, and is decrypted by using the second public key SK, to obtain an abstract value r2.

r1 is compared with r2, and if r1=r2, it indicates that the verification succeeds.

If r1 is not equal to r2, it indicates that the verification fails, log off the system, and login is locked.

In one embodiment, the SIM card delivers a verification certificate and a verification signature to the authentication server to request verification, which includes the following steps.

The original certificate is encrypted by using the first public key CK, to obtain the verification certificate.

An abstract value of the original certificate is obtained by using MD5, and then the abstract value is signed by using the first private key CP to obtain the verification signature.

The SIM card sends the verification certificate and the verification signature to the authentication server.

After the authentication server receives the verification certificate and the verification signature sent by the SIM card, the authentication server performs certificate validity verification, which includes the following steps: the authentication server decrypting, by using the first private key CP, the verification certificate sent by the SIM card, to obtain a plaintext certificate; abstracting the plaintext certificate by using MD5 to obtain an abstract value r1; at the same time, verifying, by using the first public key CK, the verification signature sent by the SIM card, to obtain an abstract value r2; finally, comparing whether r1 is equal to r2; if they are equal, verifying that the verification certificate delivered by the SIM card is the original certificate; if the verification certificate delivered by the SIM card is the original certificate, judging a validation period of the plaintext certificate; if the plaintext certificate is within the validation period, verifying that the verification certificate sent by the SIM card is valid; if the verification certificate delivered by the SIM card is not the original certificate or the validation period ends, sending an instruction and logging off the system.

After the authentication server verifies that the certificate is valid, in order to ensure delivery security of the SEK, the authentication server encrypts a local digital certificate by using the second private key SP, to obtain a PDK authorization certificate, and transmits the certificate to the SIM card.

The SIM card receives the PDK authorization certificate sent by the authentication server.

The SIM card module acquires a PDK by using the PDK authorization certificate, including the following steps.

The PDK authorization certificate sent by the authentication server is decrypted by using the second public key SK, to obtain a plaintext of the PDK authorization certificate plaintext, and a PDK index is extracted from the plaintext of the PDK authorization certificate.

An encryption public key UK and a decryption private key UP are obtained according to the ID of the SIM card and the PDK index.

The encrypted SEK sent by the authentication server is decrypted by using the decryption private key UP, to obtain a signature, decryption and verification are performed on the signature by using the first public key CK, to obtain an SEK.

As shown in FIG. 2, in Step S201, the SEK sent by the authentication server is received, and a symmetric encryption key CT is generated according to the SEK and an ID of the SIM card.

In one embodiment, the authentication server randomly generates a 16-bit string, and takes the string as the SEK.

The SEK may be further encrypted by the authentication server, which specifically includes the following steps.

The string is signed by using the first private key CP, to obtain an authentication signature.

The authentication signature is encrypted by using the encryption public key UK, to obtain the SEK.

The SEK or the encrypted SEK is delivered to the SIM card.

The SIM card receives the SEK or the encrypted SEK sent by the authentication server.

The SIM card module decrypts the encrypted SEK, including the following steps.

The encrypted SEK is decrypted by using the decryption private key UP, to obtain an authentication signature.

Decryption and verification are performed on the authentication signature by using the first public key CK, to obtain the SEK.

The SIM card module verifies that the message originates from the authentication server, and then generates, according to the SEK and the ID and through a hash function calculation result, a symmetric encryption key CT and a symmetric encryption area, and stores the symmetric encryption key CT and a temporary communication message in the symmetric encryption area.

In Step S202, according to the symmetric encryption key CT, an ECW sent by the authentication server is decrypted, to obtain a CW.

The authentication server sends the ECW to the SIM card.

The SIM card receives the ECW, and the SIM card module decrypts the ECW by using the symmetric encryption key CT to obtain the CW.

In Step S203, the CW is sent to the digital television master chip, so that the digital television master chip performs, according to the CW, descrambling on an encrypted TS sent by the authentication server.

In one embodiment, the authentication server sends the encrypted TS to the digital television master chip.

The SIM card module sends the CW to the digital television master chip, so that the digital television master chip performs, according to the CW, descrambling on the encrypted TS sent by the authentication server, to obtain a plaintext stream.

Figure 3:
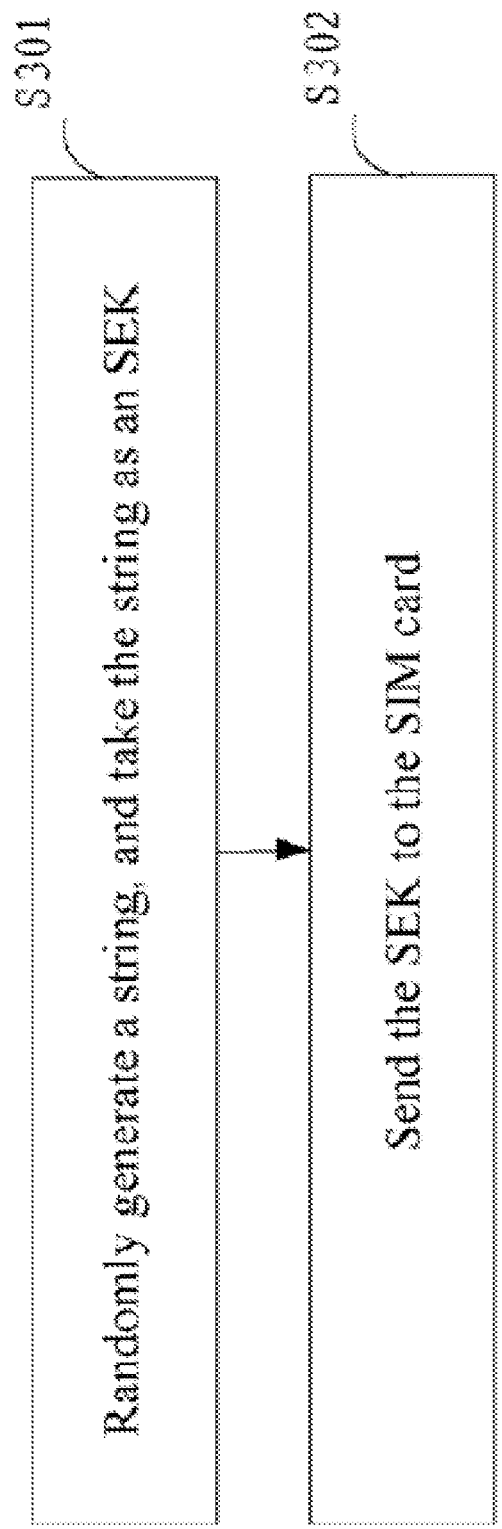
FIG. 3 is shows schematically a flow chart of implementing authentication at an authentication server according to one embodiment of the present invention.

FIG. 3 shows schematically a flow of authentication at an authentication server according to one embodiment of the present invention. In this exemplary embodiment, the authentication server receives a verification certificate and a verification signature sent by an SIM card, and performs certificate validity verification, which includes the following steps.

In Step 301, the verification certificate sent by the SIM card is decrypted by using a first private key CP, to obtain a plaintext certificate, and the plaintext certificate is abstracted by using MD5 to obtain an abstract value r1.

In Step 302, the verification signature sent by the SIM card is verified by using a first public key CK, to obtain an abstract value r2.

In Step 303, it is compared whether r1 is equal to r2, if they are equal, it is verified that the verification certificate delivered by the SIM card is an original certificate, and Step 304 is performed.

In Step 304, a validation period of the plaintext certificate is determined, if the plaintext certificate is within the validation period, it indicates that the verification certificate sent by the SIM card is valid; and if the verification certificate is not an original certificate or the validation period ends, an instruction is sent and log off the system.

After the authentication server verifies that the certificate is valid, in order to ensure delivery security of an SEK, the authentication server encrypts a local digital certificate by using a second private key SP, to obtain a PDK authorization certificate, and transmits the certificate to the SIM card; the SIM card receives the PDK authorization certificate. The SIM card module decrypts the PDK authorization certificate by using a second public key SK, to obtain a PDK authorization certificate plaintext, obtains a PDK index through the PDK authorization certificate plaintext, and obtains an encryption public key UK and a decryption private key UP according to the ID of the SIM card and the PDK index.

In Step S301, a string is randomly generated, and is taken as an SEK.

In this embodiment, the authentication server may randomly generate a string, and take the string as the SEK, where the string is a 16-bit character.

Preferably, the authentication server may also randomly generates a string, signs the string by using the first private key CP to obtain an authentication signature, and then encrypts the authentication signature by using an encryption public key UK, and uses the result as the SEK.

In Step S302, the SEK is sent to the SIM card.

In this embodiment, the authentication server sends the SEK to the SIM card. The SIM card module generates a symmetric encryption key CT according to the SEK and the ID of the SIM card; meanwhile, decrypts, by using the symmetric encryption key CT, an ECW sent by the authentication server, to obtain a CW; afterwards, the digital television master chip performs, by using the CW, descrambling on an encrypted TS sent by the authentication server, to obtain a plaintext stream.

The methods described herein may be implemented by one or more computer programs executed by one or more processors. One aspect of the present invention provides a non-transitory tangible computer-readable medium storing instructions which, when executed by the one or more processors, cause a system to perform the above-disclosed digital televisions authentication method. The computer programs may also include stored data. Non-limiting examples of the non-transitory tangible computer readable medium are non-volatile memory, magnetic storage, and optical storage. The storage medium may include, for example, CD/DVD, Read-Only Memory or ROM, and Random Access Memory or RAM, a magnetic disk, an optical disk, flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A digital television authentication system, comprising:
a digital television having a digital television master chip;
a Subscriber Identity Module (SIM) card module having a built-in SIM card; and
an authentication server wirelessly connected to the SIM card,
wherein the SIM card module comprises:
a symmetric key generation unit configured to generate a symmetric encryption key CT according to a Session Key (SEK) received by the SIM card and an identity (ID) of the SIM card; and
a Control Word (CW) acquisition unit configured to decrypt, according to the symmetric encryption key CT, an Encrypted Control Word (ECW) sent by the authentication server, so as to obtain a CW;
wherein the SIM card module is connected to the digital television master chip through a universal interface, and adapted to send the CW to the digital television master chip, so that the digital television master chip performs, according to the CW, descrambling on an encrypted Transport Stream (TS) sent by the authentication server; and
wherein the authentication server comprises:
an SEK generation unit configured to randomly generate a string and taking the string as an SEK; and
an SEK sending unit configured to send the SEK to the SIM card module.

2. The digital television authentication system according to claim 1, wherein the SIM card module further comprises:
an authorization certificate decryption unit configured to decrypt, by using a second public key SK, a Personal Distribute Key (PDK) authorization certificate received by the SIM card, to obtain plaintext of the PDK authorization certificate, and to extract a PDK index from the plaintext of the PDK authorization certificate;
a PDK acquisition unit configured to acquire an encryption public key UK and a decryption private key UP according to the ID of the SIM card and the PDK index; and
an SEK decryption unit configured to decrypt, by using the decryption private key UP, an encrypted SEK received by the SIM card, to obtain a signature, and to perform decryption and verification on the signature by using a first public key CK, to obtain the SEK; and
wherein the authentication server further comprises:
an authorization certificate generation unit configured to encrypt, by using a second private key SP, a digital certificate stored at the authentication server, and to generate the PDK authorization certificate;
an authorization certificate sending unit configured to send the PDK authorization certificate to the SIM card; and
an SEK encryption unit configured to sign, by using a first private key CP, a randomly generated string, and to encrypt the signature by using the encryption public key UK, to obtain the encrypted SEK.

3. The digital television authentication system according to claim 1, wherein the SIM card module further comprises:
an encryption unit configured to encrypt, by using the first public key CK, an original certificate stored in the SIM card module, to obtain a verification certificate; and
a signing unit configured to obtain an MD5 abstract value of the original certificate stored in the SIM card module, and to sign an abstract value by using the first private key CP, to obtain a verification signature; and
wherein the authentication server further comprises:
a certificate validity verification unit configured to decrypt, by using the first private key CP, the verification certificate sent by the SIM card to obtain a plaintext certificate, to abstract the plaintext certificate by using MD5 abstraction to obtain an abstract value r1, meanwhile, to verify, by using the first public key CK, the verification signature sent by the SIM card to obtain an abstract value r2, and finally, to compare whether r1 is equal to r2;
if they are equal, to verify that the verification certificate delivered by the SIM card is the original certificate;
if the verification certificate delivered by the SIM card is the original certificate, to determine a validation period of the plaintext certificate; and
if the plaintext certificate is within the validation period, to verify that the verification certificate sent by the SIM card is valid, and to send a PDK authorization certificate to the SIM card.

4. The digital television authentication system according to claim 1, wherein the digital television master chip comprises:
a certificate integrity verification unit configured to verify integrity of an original certificate stored in the SIM card module;
an SIM card ID authentication unit configured to verify the ID of the SIM card module;
a program code verification unit configured to verify integrity of a program code stored in the SIM card module; and
a user password verification unit configured to verify whether an original password stored in the SIM card module is consistent with a password input by the user.

5. The digital television authentication system according to claim 1, configured to perform user verification on the basis of a Public Key Infrastructure (PKI).

6. A digital television authentication method, comprising:
receiving a Session Key (SEK) sent by an authentication server, and generating a symmetric encryption key CT according to the SEK and an identity (ID) of a Subscriber Identity Module (SIM) card;
decrypting, according to the symmetric encryption key CT, an Encrypted Control Word (ECW) sent by the authentication server, to obtain a Control Word (CW); and
sending the CW to a digital television master chip, so that the digital television master chip performs, according to the CW, descrambling on an encrypted Transport Stream (TS) sent by the authentication server.

7. The digital television authentication method according to claim 6, prior to receiving the SEK sent by the authentication server, further comprising:
decrypting, by using a second public key SK, a Personal Distribute Key (PDK) authorization certificate sent by the authentication server, to obtain plaintext of the PDK authorization certificate, and extracting a PDK index from the plaintext of the PDK authorization certificate;
obtaining an encryption public key UK and a decryption private key UP according to the ID of the SIM card and the PDK index; and
decrypting, by using a decryption private key UP, an encrypted SEK sent by the authentication server, to obtain a signature, and performing decryption and verification by using the first public key CK, to obtain the SEK.

8. The digital television authentication method according to claim 6, prior to decrypting, by using the second public key SK, the PDK authorization certificate sent by the authentication server, further comprising:
  encrypting the original certificate by using the first public key CK, to obtain a verification certificate; and
  obtaining an MD5 abstract value of the original certificate, and then signing the abstract value by using a first private key CP to obtain a verification signature.

9. A non-transitory tangible computer-readable medium storing instructions which, when executed by a processor, cause a system to perform a digital television authentication method, the method comprising:
  receiving a Session Key (SEK) sent by an authentication server, and generating a symmetric encryption key CT according to the SEK and an identity (ID) of a Subscriber Identity Module (SIM) card;
  decrypting, according to the symmetric encryption key CT, an Encrypted Control Word (ECW) sent by the authentication server, to obtain a Control Word (CW); and
  sending the CW to a digital television master chip, so that the digital television master chip performs, according to the CW, descrambling on an encrypted Transport Stream (TS) sent by the authentication server.

10. The non-transitory tangible computer-readable medium according to claim 6, wherein the method, prior to receiving the SEK sent by the authentication server, further comprising:
  decrypting, by using a second public key SK, a Personal Distribute Key (PDK) authorization certificate sent by the authentication server, to obtain plaintext of the PDK authorization certificate, and extracting a PDK index from the plaintext of the PDK authorization certificate;
  obtaining an encryption public key UK and a decryption private key UP according to the ID of the SIM card and the PDK index; and
  decrypting, by using a decryption private key UP, an encrypted SEK sent by the authentication server, to obtain a signature, and performing decryption and verification by using the first public key CK, to obtain the SEK.

11. The non-transitory tangible computer-readable medium according to claim 6, wherein the method, prior to decrypting, by using the second public key SK, the PDK authorization certificate sent by the authentication server, further comprising:
  encrypting the original certificate by using the first public key CK, to obtain a verification certificate; and
  obtaining an MD5 abstract value of the original certificate, and then signing the abstract value by using a first private key CP to obtain a verification signature.

* * * * *

UNITED STATES PATENT AND TRADEMARK OFFICE
CERTIFICATE OF CORRECTION

PATENT NO. : 8,909,919 B2  Page 1 of 1
APPLICATION NO. : 13/844880
DATED : December 9, 2014
INVENTOR(S) : Zhao-Fu Yu et al.

It is certified that error appears in the above-identified patent and that said Letters Patent is hereby corrected as shown below:

Assignee: title page, Item 73, Line 3: "(CA)" should read -- (CN) --.

Signed and Sealed this
Ninth Day of June, 2015

Michelle K. Lee
*Director of the United States Patent and Trademark Office*